(12) United States Patent
Jussel et al.

(10) Patent No.: US 10,889,954 B2
(45) Date of Patent: Jan. 12, 2021

(54) METHOD FOR CONTROLLING A VIBRATING PILE DRIVER

(71) Applicant: Liebherr-Werk Nenzing GmbH, Nenzing (AT)

(72) Inventors: Patrick Jussel, Bludenz (AT); Gerhard Kaufmann, Nenzing (AT); Andreas Schwarzhans, Schruns (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 260 days.

(21) Appl. No.: 15/188,015

(22) Filed: Jun. 21, 2016

(65) Prior Publication Data

US 2016/0369471 A1 Dec. 22, 2016

(30) Foreign Application Priority Data

Jun. 22, 2015 (DE) .......................... 10 2015 008 015

(51) Int. Cl.
| | |
|---|---|
| *E02D 7/06* | (2006.01) |
| *E02D 7/18* | (2006.01) |
| *E02D 11/00* | (2006.01) |
| *E02D 1/02* | (2006.01) |
| *E02D 1/08* | (2006.01) |

(Continued)

(52) U.S. Cl.
CPC .............. *E02D 7/06* (2013.01); *E02D 1/022* (2013.01); *E02D 1/08* (2013.01); *E02D 7/18* (2013.01); *E02D 11/00* (2013.01); *G05B 15/02* (2013.01); *G06F 17/18* (2013.01)

(58) Field of Classification Search
CPC .. B06B 1/166; B06B 1/12; E02D 7/02; E02D 7/06; E02D 7/00; E02D 7/18; E02D 1/022; E02D 1/027; E02D 33/00; E02D 11/00

USPC ................ 173/2, 46; 310/81; 405/232, 228; 700/275

See application file for complete search history.

(56) References Cited

U.S. PATENT DOCUMENTS 3,648,467 A * 3/1972 Ogawa .................... E02D 3/106
405/240
6,301,551 B1 * 10/2001 Piscalko ................. E02D 13/06
340/853.8

(Continued)

FOREIGN PATENT DOCUMENTS

| DE | 19631992 A * 8/1996 |
|---|---|
| DE | 196 31 992 A1 2/1998 |

(Continued)

*Primary Examiner* — Kretelia Graham
(74) *Attorney, Agent, or Firm* — Dilworth & Barrese, LLP

(57) ABSTRACT

The present invention relates to a method for controlling a vibrating pile driver when driving a pile element (4) into a ground (6), wherein the vibrating pile driver includes a vibration unit (2) connected with the same and is attached to a carrier machine (5, 1), the method comprising the following steps: detecting at least one first status parameter of the carrier machine (5, 1) and detecting at least one second status parameter of the vibration unit (2). The method is characterized in that with reference to the at least one first status parameter and the at least one second status parameter a statistical ground model is generated, and individual operating parameters of the carrier machine (5, 1) and the vibration unit (2) are adapted to the statistical ground model, in order to optimize the energy consumption and/or an advance rate when driving in the pile element (4).

11 Claims, 2 Drawing Sheets

(51) Int. Cl.
    *G05B 15/02*      (2006.01)
    *G06F 17/18*      (2006.01)

(56)            References Cited

U.S. PATENT DOCUMENTS 6,345,546 B1      2/2002   Houze
  7,870,910 B2 *    1/2011   Heichel .................... E02D 7/18
                                                            173/142
  2007/0074881 A1 * 4/2007   Bermingham ............ E02D 7/02
                                                              173/2
  2009/0188687 A1 * 7/2009   Heichel .................. B06B 1/166
                                                             173/49
  2009/0189467 A1 * 7/2009   Heichel .................. B06B 1/166
                                                             310/81
  2011/0056750 A1 * 3/2011   Lucon ...................... E21B 7/24
                                                             175/56
  2014/0219726 A1 * 8/2014   Degen ..................... E02D 1/025
                                                            405/232
  2016/0108598 A1 * 4/2016   Waxse ..................... E02D 7/06
                                                             173/46
  2016/0122968 A1 * 5/2016   Jung ........................ E02D 7/02
                                                            405/232
  2016/0130777 A1 * 5/2016   Stam ........................ E02D 7/06
                                                            405/228

FOREIGN PATENT DOCUMENTS

DE       10 2011 103401 A1    12/2012
  DE         102011103401 A  *  12/2012

* cited by examiner

METHOD FOR CONTROLLING A VIBRATING PILE DRIVER

BACKGROUND OF THE INVENTION

The present invention relates to a method for controlling a vibrating pile driver.

Vibrating pile drivers are machines for vibration driving or extracting sheet piles, pipes, concrete and wood piles or beams (=pile elements). The pile elements are vibrated by vertical vibrations. These vibrations, which are transmitted to the pile elements, displace the surrounding soil, whereby a reduction of the resistance between soil and pile element is obtained. As a result, the pile elements are driven into the ground by means of their own weight and the weight of the vibrating pile driver.

In conventional vibration methods, the operator of a vibrating pile driver can manually adjust the various vibration parameters, wherein physical and technical limits are to be observed. For example, vibration frequencies of less than 20 kHz can lead to massive damages in surrounding buildings. At frequencies of about 20 Hz, the machine can be damaged due to its natural frequency. Frequencies greater than 50 Hz likewise can develop a destructive effect at corresponding amplitudes.

DE 196 31 992 A1 discloses a vibration driver with a control device, in which the vibration amplitude can be adjusted in dependence on the frequency. It should thereby be possible to raise the advance rate (=speed of driving the pile element into the ground).

SUMMARY OF THE INVENTION

It is the objective of the present invention to further increase the advance rate of the pile element to be driven into a ground and/or to minimize the energy consumption with respect to the advance.

The problem described above is solved by the method for controlling a vibrating pile driver, which comprises the features herein.

The invention relates to a method for controlling a vibrating pile driver when driving a pile element into a ground, wherein the vibrating pile driver includes a vibration unit connected with the same and is attached to a carrier machine, and in the method at least one first status parameter of the carrier machine is detected, and at least one second status parameter of the vibration unit is detected. The method furthermore is characterized in that with reference to the at least one first status parameter and the at least one second status parameter a statistical ground model is generated, and individual operating parameters of the carrier machine and the vibration unit are adapted to the statistical ground model, in order to optimize the energy consumption and/or an advance rate when driving in the pile element.

The carrier machine is a working machine which typically is connected with a vibration unit by means of a leader. The leader can move the vibration unit along an axis in direction of the ground into which the pile element is to be driven or from which the pile element is to be extracted. On the side of the vibration unit facing the ground the pile element is attached by means of a pair of clamping tongs. Due to this attachment, the vibrations proceeding from the vibration unit are transmitted to the pile element. Nevertheless, the guidance of the vibration unit by means of a leader is not absolutely necessary. It also is possible to freely move the vibration unit up and down on a crane or the like. In contrast to the leader-guided vibration driving, the free-riding vibration driving hence is configured without guidance of a leader.

The vibration unit is designed to carry out a vibration, in order to vibration-drive the pile element into the ground. The principle of vibration driving consists in reducing the friction and the tip resistance between the pile element and the ground connected with the pile element. The vibration unit also referred to as vibration driver generates vibrations which are transmitted into the pile element. The vibrating pile element triggers vibrations in the surrounding soil in close proximity. The surrounding ground temporarily is put into a pseudo liquid condition. The friction between pile element and ground thereby is greatly reduced, so that the pile element can be vibration-driven into the ground.

During vibration driving of a pile element into the ground, a first status parameter of the carrier machine is detected. In addition, a second status parameter of the vibration unit is detected. On the basis of the detected status parameters a statistical ground model is generated and/or a statistical ground model is inferred. By adapting the operating parameters of the carrier machine and the vibration unit to the generated statistical ground model it is possible to optimize the energy consumption and/or an advance rate when driving in the pile element.

By generating the statistical ground model, the operating parameters of the carrier machine and the operating parameters of the vibration unit can be adapted to the generated statistical ground model. It thereby is ensured that even with a change of the statistical ground model, for example a variation of the soil composition, the optimum operating parameters each are provided to the carrier machine and the vibration unit. In contrast to the prior art, the inputs of an operator of the vibrating pile driver hence are not blindly trusted, but a change of the operating parameters is made with regard to the generation of the statistical ground model. Even faster driving in of the pile element and/or a reduced energy consumption when driving in the pile element thereby is achieved.

Preferably, the at least one first status parameter of the carrier machine is an advance force of the pile element, an advance rate of the pile element, a penetration depth of the pile element, an engine power of the carrier machine and/or an energy consumption of the carrier machine.

Advance force of the pile element is considered to be the force with which the pile element is driven into the ground.

The at least one second status parameter of the vibration unit preferably comprises a frequency of the vibration transmitted to the pile element by the vibration unit, an amplitude of the vibration transmitted to the pile element by the vibration unit and/or an acceleration of the vibration unit.

Useful operating parameters of the carrier machine and the vibration unit preferably include an advance force of the pile element, an advance rate of the pile element, a frequency of the pile element vibration and/or an amplitude of the pile element vibration (frequency and amplitude each related to the vibration unit).

Preferably, the statistical ground model is generated by a comparison of the at least one first and the at least one second status parameter with the operating parameters of the carrier machine and the vibration unit. A discrepancy or a connection between the status parameters to be expected can be employed when specifying known operating parameters for generating the statistical ground model.

According to another preferred modification of the invention the statistical ground model includes a depth profile in driving direction of the pile element, in order to provide for an adaptive adaptation of the operating parameters of the carrier machine and the vibration unit in dependence on the penetration depth of the pile element. It thereby is possible that in dependence on the penetration depth of the pile element the operating parameters are varied such as to each obtain optimum results with regard to the generated statistical ground model. For example, during transition from a harder into a softer soil layer the frequency of the vibration, the amplitude of the vibration and/or the advance force is adapted.

According to an advantageous development of the invention a statistical ground model once generated is stored and used for generating a further statistical ground model when driving in a further pile element.

In many vibratory applications not only an individual pile element is driven in, but a plurality of pile elements one beside the other or at least in local proximity to each other. It is theoretically conceivable that the ground model now varies from pile element to pile element, but in most cases a limited continuity of the soil layers can be assumed. To more quickly achieve the adaptation of the operating parameters when driving in several pile elements, which are arranged in a certain spatial proximity to each other, and to thereby further optimize the advance in terms of speed and energy consumption, the information gained in the preceding driving processes, i.e. the previously generated statistical ground models, can be used. On the basis of this information present already and/or the statistical ground models obtained already and stored, a reliable prediction of the current ground model is possible. The uncertainties during generation of the current statistical ground model thereby can be reduced and the adaptation of the operating parameters can be realized more quickly and more effectively in a reliable way. In general, this leads to an even faster and more energy-efficient pile driving operation.

Preferably, the influence of the stored ground model on the further statistical ground model to be generated is the smaller, the greater the spatial distance is between the location of the stored ground model and the further ground model to be generated.

It also is conceivable that the influence of the stored ground model on the further statistical ground model to be generated is the smaller, the older the stored ground model is as compared to the entirety of all stored ground models.

In addition, in another advantageous modification of the invention framework parameters for the operating parameters of the carrier machine and the vibration unit can be entered by an operator during generation of a first one of a plurality of ground models, so as not to violate environmental requirements.

Thus, the operator of the vibrating pile driver can manually fix limits for critical drive parameters, so as not to exceed for example a critical limit frequency, which must not be exceeded, and a maximum limit frequency which must not be exceeded. In addition, technical and/or spatial limits are given depending on the construction of the carrier machine, which limit the space for the drive parameters in all dimensions.

During the manual input of framework parameters, care is taken in particular that environmental requirements are not violated. This includes that certain frequency ranges of vibrations are to be avoided in the vicinity of buildings, as the same otherwise can be damaged.

Preferably, the framework parameters can comprise a lower limit frequency, an upper limit frequency, a maximum amplitude and/or a minimum amplitude of the vibration of the vibration unit.

According to another optional feature of the invention the statistical ground model is created by means of a database which with reference to a value of the at least one first status parameter and the at least one second status parameter permits a conclusion as to a particular type of soil. It is conceivable that the database already has been created experimentally prior to driving in the pile element and is available during the vibration process of the vibrating pile driver. It thereby is possible to generate a statistical ground model due to the detection of the first and the second status parameter, which model cannot resort to any further fundamentals such as statistical ground models stored already in local proximity.

It also is possible that the operating parameters supplied to the carrier machine and the vibration unit additionally are used for generating the statistical ground model.

Another advantageous aspect of the invention consists in that a stored ground model, which has been generated when driving in a pile element, is evaluated, in order to provide for a conclusion as to the stability of the pile element driven in and/or to provide for a conclusion as to the soil layers. Conventionally, special test drillings would be necessary for such conclusions, which can now be omitted due to the invention. In particular, the conclusion as to the stability of the pile element driven in represents an effective possibility to detect possible irregularities in the anchorage of the pile element at an early stage, so that major damages can be averted in good time.

Preferably, the ground model is a ground depth profile, which indicates various properties of the ground along the driving direction of the pile element.

BRIEF DESCRIPTION OF THE DRAWINGS

The invention will be explained in detail below with reference to the Figures and an exemplary embodiment. In the drawings.

DESCRIPTION OF THE PREFERRED EMBODIMENTS

Figure 1:
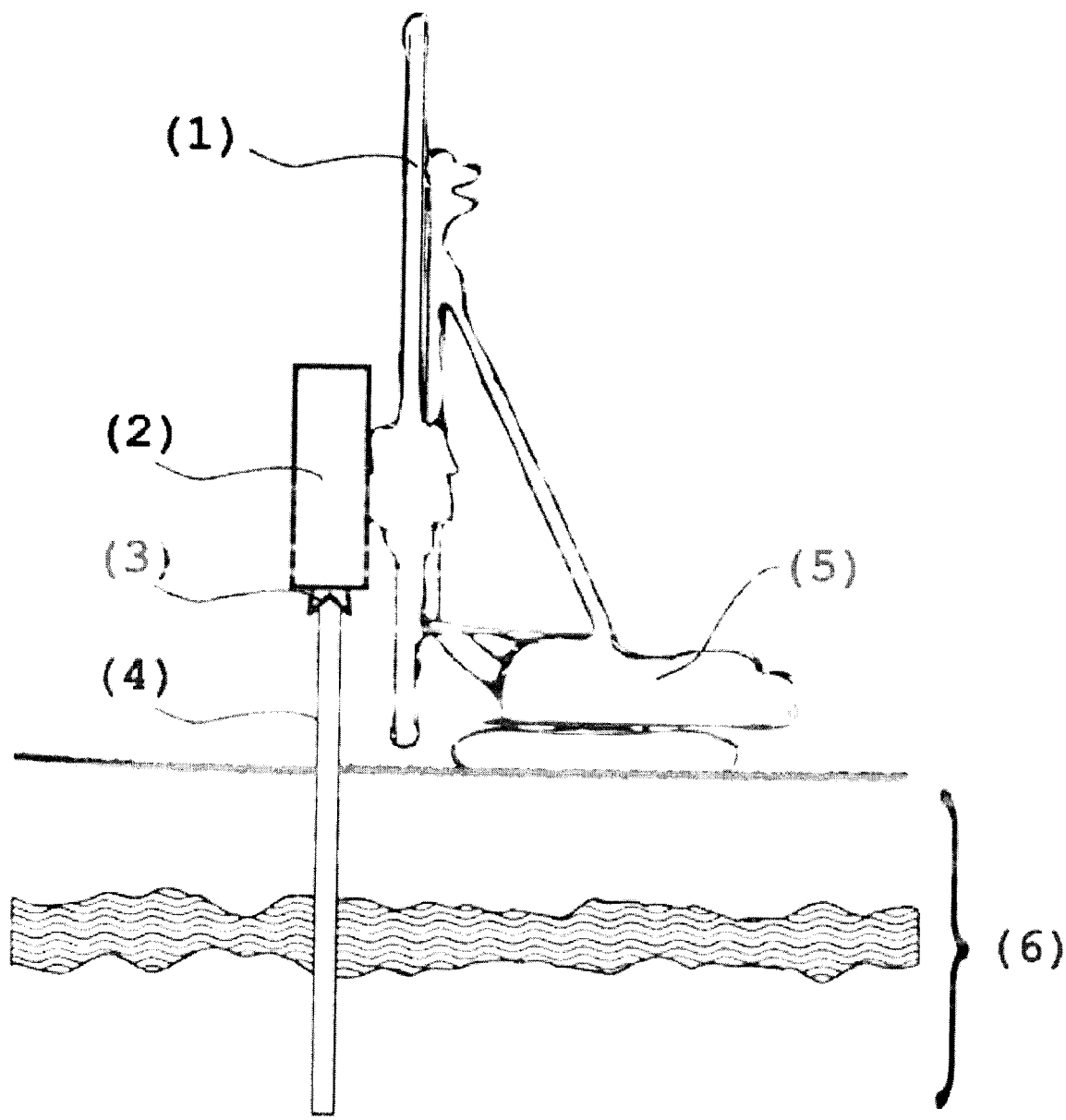
FIG. 1: shows the sketch of a vibrator while driving in a pile element.

FIG. 1 shows a working machine 5 equipped with a leader 1, along which a vibration unit 2 or a vibrator is movably arranged. The vibration unit 2 includes a pair of clamping tongs 3 with which a pile element 4 (e.g. a sheet pile wall, a beam, pillar, etc.) is driven into a ground 6.

Via the leader 1, the vibration unit 2 is lowered with the feed force $F_v$, with the advance rate $v_v$, in order to press the pile element 4 into the ground. To minimize the ground resistance, the vibration unit 2 puts the pile element 4 into vibrations along the driving axis with a frequency $f_v$ and an amplitude $A_v$. The vibration is generated by several rotating imbalances, wherein the rotational frequency defines the vibration frequency and the position of the imbalances relative to each other defines the amplitude. The entirety of the adjustable parameters $F_v$, $f_v$, $A_v$ and $v_v$, in the following are referred to as drive parameters (also called operating parameters) $P_v$.

The working machine 5 is equipped with a plurality of sensors which record for instance the advance rate, the advance force, the engine power and the energy consumption (REACTION VIBRATOR). In addition, the vibration unit 2 is equipped with an acceleration sensor and a microprocessor which can output both frequencies and amplitudes.

By combining the drive parameters $P_v$ with the sensor information of the machine and of the acceleration sensor, a simplified statistical model of the ground now is created in ongoing operation, in which the ground profile is recorded in simplified form.

Figure 2:
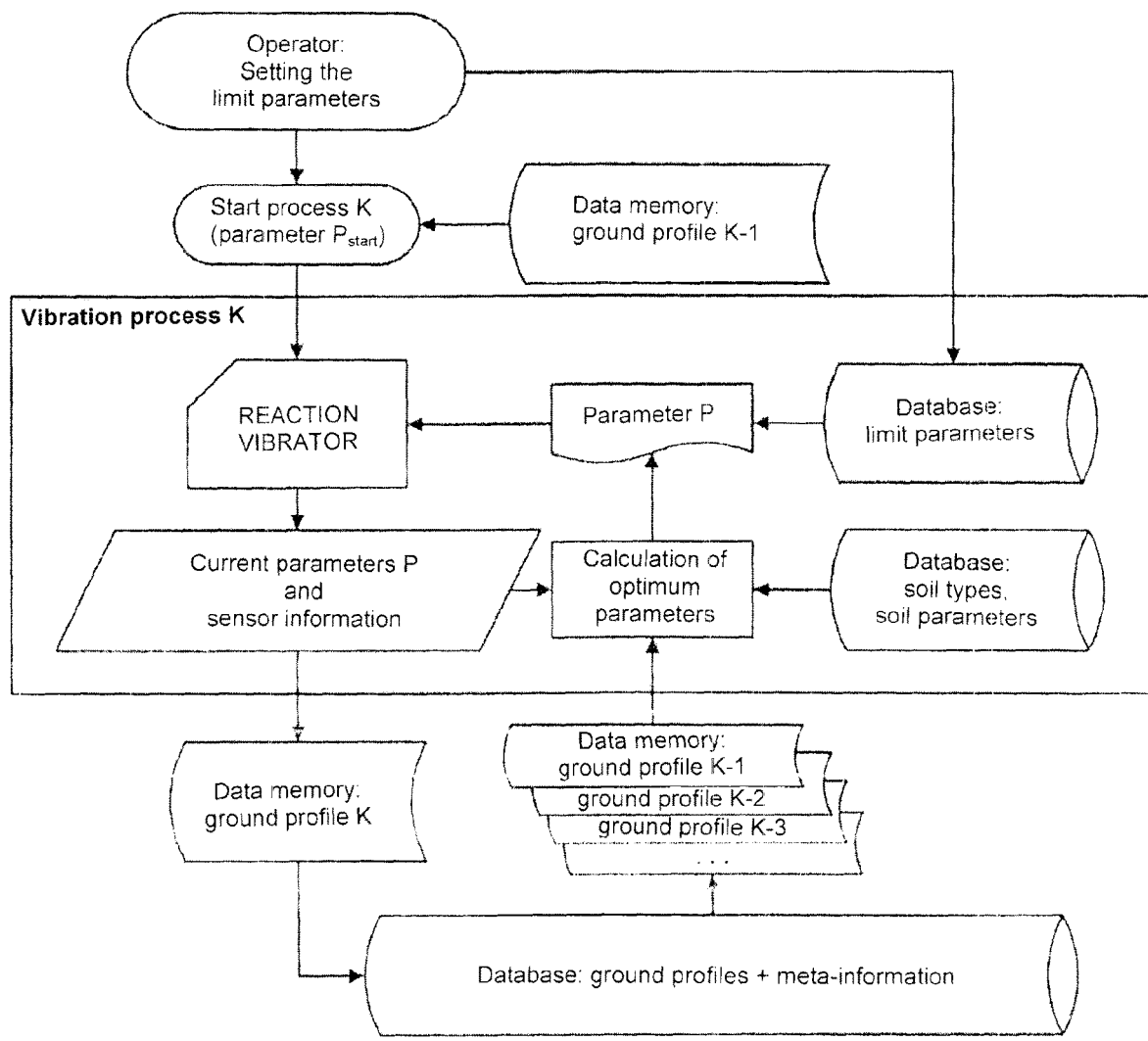
FIG. 2: shows a flow diagram of the method according to the invention.

The corresponding process is schematically shown in FIG. 2.

In controlled recordings, a wide variety of soils was examined for their behavior by varying the drive parameters when driving in pile elements, and by the obtained sensor information a statistical ground model was determined (for example the attenuation of the vibration in dependence on the depth as a parameter of the model). The information correspondingly can be retrieved locally in a database as basic information. Depending on the given conditions, optimum drive parameters are chosen, wherein the choice of the parameters by means of a statistical algorithm reacts flexibly to all possible types of soil (for example by interpolation of various soil parameters). In ongoing operation, the drive parameters now can be adjusted depending on the respective soil conditions such that the advance rate and/or the energy consumption are optimized.

As additional condition, some framework conditions must of course be observed. Thus, the operator can manually fix limits for critical drive parameters, such as for example a critical limit frequency which must not be undershot, and a maximum limit frequency which must not be exceeded. Furthermore, technical limits are given depending on the construction of the carrier machine 5, 1 or of the vibrator, which limit the space for the drive parameters in all dimensions.

In the following, an exemplary embodiment will be described concretely.

There is used a carrier machine equipped with a vibrator, in order to drive in a series of sheet pile walls in a row. Initially, the operator of the vibrating pile driver adjusts the allowed framework parameters for the vibratory operation due to external circumstances (e.g. requirements of geologists). The method according to the invention is initialized after positioning the first sheet pile wall (e.g. the mass of the sheet pile walls can be included in the method as additional information, wherein the length of the sheet pile wall is determined by the position of the vibration unit at the leader (meta-information)).

The operator starts with vibration driving, starting with a standard set of parameters $P_{start}$ within the allowed limits. During the process of vibration driving, the development of the statistical ground model starts and, as soon as a certain convergence exists, the machine parameters are adjusted to more optimum values. During the vibration process data continue to be recorded and a depth profile of the ground is created, which allows an adaptive adaptation of the machine parameters P.

Now, data are taken continuously, a new model K is created and processed statistically with the previous data K-1, K-2, K-3.

After successful vibration driving or shaking of the first sheet pile wall, the next sheet pile wall is positioned beside the first one and adjusted. The present shaking process makes use of the information gained in conjunction with the first sheet pile wall and starts vibration driving with the corresponding, optimum machine parameters. Now, data are taken continuously, a new model is created and processed statistically with the previous data. To ensure that with extremely varying soils the statistical processing permits no false conclusions, it is ensured that information dating back longer or information which has been gained farther away becomes less important.

The invention claimed is:

1. A method for controlling a vibrating pile driver when driving a pile element (4) into a ground (6), wherein the vibrating pile driver includes a vibration unit (2) connected with the pile element (4) and is attached to a carrier machine (5, 1), the method comprising the following steps:
    detecting at least one first status parameter of the carrier machine (5, 1);
    detecting at least one second status parameter of the vibration unit (2);
    generating a statistical ground model based on the at least one first status parameter of the carrier machine (5, 1) and the at least one second status parameter of the vibration unit (2);
    adapting individual operating parameters of the carrier machine (5, 1) and of the vibration unit (2) to the generated statistical ground model; and
    optimizing energy consumption of the carrier machine (5, 1) with respect to an advance rate when driving the pile element (4), based on the adaptation of the individual operating parameters,
        wherein the statistical ground model is stored and used for generating a further statistical ground model, and
        the smaller the influence of the stored statistical ground model on the further statistical ground model, the greater a spatial distance between a location associated with the stored statistical ground model and a location associated with the further statistical ground model to be generated.

2. A method for controlling a vibrating pile driver when driving a pile element (4) into a ground (6), wherein the vibrating pile driver includes a vibration unit (2) connected with the pile element (4) and is attached to a carrier machine (5, 1), the method comprising the following steps:
    detecting at least one first status parameter of the carrier machine (5, 1);
    detecting at least one second status parameter of the vibration unit (2);
    generating a statistical ground model based on the at least one first status parameter of the carrier machine (5, 1) and the at least one second status parameter of the vibration unit (2);
    adapting individual operating parameters of the carrier machine (5, 1) and of the vibration unit (2) to the generated statistical ground model; and
    optimizing energy consumption of the carrier machine (5, 1) with respect to an advance rate when driving the pile element (4), based on the adaptation of the individual operating parameters,
        wherein the statistical ground model is stored and used for generating a further statistical ground model, and
        the smaller the influence of the stored statistical ground model on the further statistical ground model, the older the stored statistical ground model compared to an entirety of all stored statistical ground models.

3. A method of controlling a vibrating pile driver when driving a pile (4) into a ground (6), the vibrating pile driver having a vibration unit (2) communicating therewith and being attached to a carrier machine (5, 1), the method comprising the steps of:
    detecting at least one first state parameter of the carrier machine (5, 1), and detecting at least one second state parameter of the vibration unit (2), wherein the at least one first state parameter of the carrier machine (5, 1) is a driving force of the pile (4), a driving speed of the pile (4), a penetration depth of the pile (4), a motor power of the carrier machine (5, 1) and/or an energy consumption of the carrier machine (5, 1), the at least one second state parameter of the vibration unit (2) is a frequency of vibration transmitted through the vibration unit (2) to the pile (4), an amplitude of the vibration transmitted through the vibration unit (2) to the pile (4) and/or an acceleration of the vibration unit (2), using the at least one first state parameter and the at least one second state parameter, a statistical ground model is generated in the form of a soil depth profile which represents different properties of the soil along a driving direction of the pile, individual operating parameters of the carrier machine (5, 1) and the vibration unit (2) are adapted to the statistical ground model to optimise energy consumption and/or a driving speed when driving in the pile (4), the statistical ground model generated once is stored and used to generate a further statistical ground model when driving in a further pile (4), the smaller the influence of the stored statistical ground model on the further statistical ground model, the greater a spatial distance between a location associated with the stored statistical ground model and a location associated with the further statistical ground model to be generated, or the smaller the influence of the stored statistical ground model on the further statistical ground model, the older the stored statistical ground model compared to an entirety of all stored statistical ground models.

4. The method according to claim 3, wherein the operating parameters of the carrier machine and the vibration unit (2) are driving force of the pile (4), driving speed of the pile (4), frequency of pile vibration and/or amplitude of pile vibration.

5. The method according to claim 3, wherein the statistical ground model has a depth profile in the driving direction of the pile (4) to enable adaptive adaptation of the operating parameters of the carrier machine and the vibration unit (2) as a function of the penetration depth of the pile (4).

6. The method according to claim 3, wherein a plurality of stored statistical ground models is used to generate the further statistical ground model.

7. The method according to claim 3, wherein frame parameters for the operating parameters of the carrier machine (5, 1) and the vibration unit (2) are input by an operator.

8. The method according to claim 7, wherein the frame parameters comprise a lower cut-off frequency, an upper cut-off frequency, a maximum amplitude and/or a minimum amplitude of vibration of the vibration unit (2).

9. The method according to claim 3, wherein the statistical ground model is created with the aid of a database which allows a deduction of a certain soil type from a value of at least one first status parameter and at least one second status parameter.

10. The method according to claim 3, wherein the stored ground model, which has been generated by driving in the pile (4), is evaluated to enable a conclusion to be drawn about stability of the pile (4) being driven in and/or soil layers.

11. The method according to claim 3, wherein the statistical ground model is a soil depth profile.

* * * * *